(12) United States Patent
Bazinski et al.

(10) Patent No.: US 7,731,258 B2
(45) Date of Patent: Jun. 8, 2010

(54) CENTER FLOOR CONSOLE SLIDING ARMREST

(75) Inventors: Steve Norman Bazinski, Amherstburg (CA); Heidi Dibble, New Boston, MI (US); Barry Cincoski, St. Clair Shores, MI (US); Joseph McKeever, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1196 days.

(21) Appl. No.: 11/163,162

(22) Filed: Oct. 7, 2005

(65) Prior Publication Data

US 2006/0279123 A1    Dec. 14, 2006

Related U.S. Application Data

(60) Provisional application No. 60/690,467, filed on Jun. 14, 2005.

(51) Int. Cl.
 *B60R 11/06* (2006.01)
(52) U.S. Cl. .................................. 296/37.8; 296/24.34
(58) Field of Classification Search ................ 296/37.8, 296/24.34, 107.16, 107.18, 24.3; 297/411.35
 See application file for complete search history.

(56) References Cited

U.S. PATENT DOCUMENTS

| | | | | |
|---|---|---|---|---|
| 2,661,119 | A * | 12/1953 | Spiess, Jr. et al. ............ 220/815 |
| 4,146,159 | A | 3/1979 | Hemmen | |
| 4,521,056 | A * | 6/1985 | Lindenmuth ............ 297/411.21 |
| 4,934,750 | A * | 6/1990 | Eichler et al. ............... 296/37.8 |
| 5,845,965 | A * | 12/1998 | Heath et al. ............. 297/188.19 |
| 6,003,927 | A | 12/1999 | Korber et al. | |
| 6,007,155 | A | 12/1999 | Hara et al. | |
| 6,045,173 | A * | 4/2000 | Tiesler et al. ............... 296/37.8 |
| 6,244,648 | B1 | 6/2001 | Gackstatter | |
| 6,419,314 | B1 * | 7/2002 | Scheerhorn ............ 297/188.19 |
| 6,435,587 | B1 * | 8/2002 | Flowerday et al. .......... 296/37.8 |
| 6,616,206 | B2 * | 9/2003 | Luginbill et al. ........... 296/37.8 |
| 6,682,116 | B1 * | 1/2004 | Okumura .................... 296/37.8 |
| 6,719,367 | B2 | 4/2004 | Mic et al. | |
| 6,749,079 | B2 | 6/2004 | Katagiri et al. | |

(Continued)

FOREIGN PATENT DOCUMENTS

JP          06099775        4/1994

(Continued)

*Primary Examiner*—Kiran B. Patel
(74) *Attorney, Agent, or Firm*—Gregory P. Brown; Price, Heneveld, Cooper, DeWitt & Litton, LLP

(57) ABSTRACT

A console sliding armrest assembly for a vehicle includes a storage compartment having an opening for allowing ingress and egress of objects, and a console lid pivotally connected to the storage compartment. The lid may include a sliding armrest operatively engaged therewith. A guide assembly may be disposed within the lid for guiding the armrest, and may include a slider frame connected to the armrest. A guide plate may be connected to the lid for supporting the armrest, and a rail may be secured in the slider frame. The guide plate may be slidably engaged with the rail for allowing sliding movement of the armrest. A spring may be disposed between the slider frame and the rail, and may be engaged to either the slider frame or the rail for biasing the rail against the guide plate, and for thereby regulating tension in the guide assembly.

7 Claims, 4 Drawing Sheets

U.S. PATENT DOCUMENTS

| | | | |
|---|---|---|---|
| 7,029,049 B2 * | 4/2006 | Rockafellow et al. | 296/37.8 |
| 7,077,468 B2 * | 7/2006 | Maierholzner | 297/188.19 |
| 7,114,772 B2 * | 10/2006 | Kobayashi et al. | 297/188.04 |
| 7,192,070 B2 * | 3/2007 | Radu et al. | 296/24.34 |
| 7,264,291 B2 * | 9/2007 | Radu et al. | 296/24.34 |
| 7,413,229 B2 * | 8/2008 | Kukucka et al. | 296/24.34 |
| 7,431,365 B2 * | 10/2008 | Sturt et al. | 296/24.34 |
| 2002/0089217 A1 | 7/2002 | Scheerhorn | |
| 2004/0080173 A1 | 4/2004 | Niwa et al. | |
| 2007/0262632 A1 * | 11/2007 | Cody et al. | 297/411.35 |
| 2009/0174211 A1 * | 7/2009 | Lota et al. | 296/37.8 |
| 2009/0174236 A1 * | 7/2009 | Lota et al. | 297/188.19 |

FOREIGN PATENT DOCUMENTS

| | | |
|---|---|---|
| JP | 2000159026 | 6/2000 |
| JP | 2005021289 | 1/2005 |

\* cited by examiner

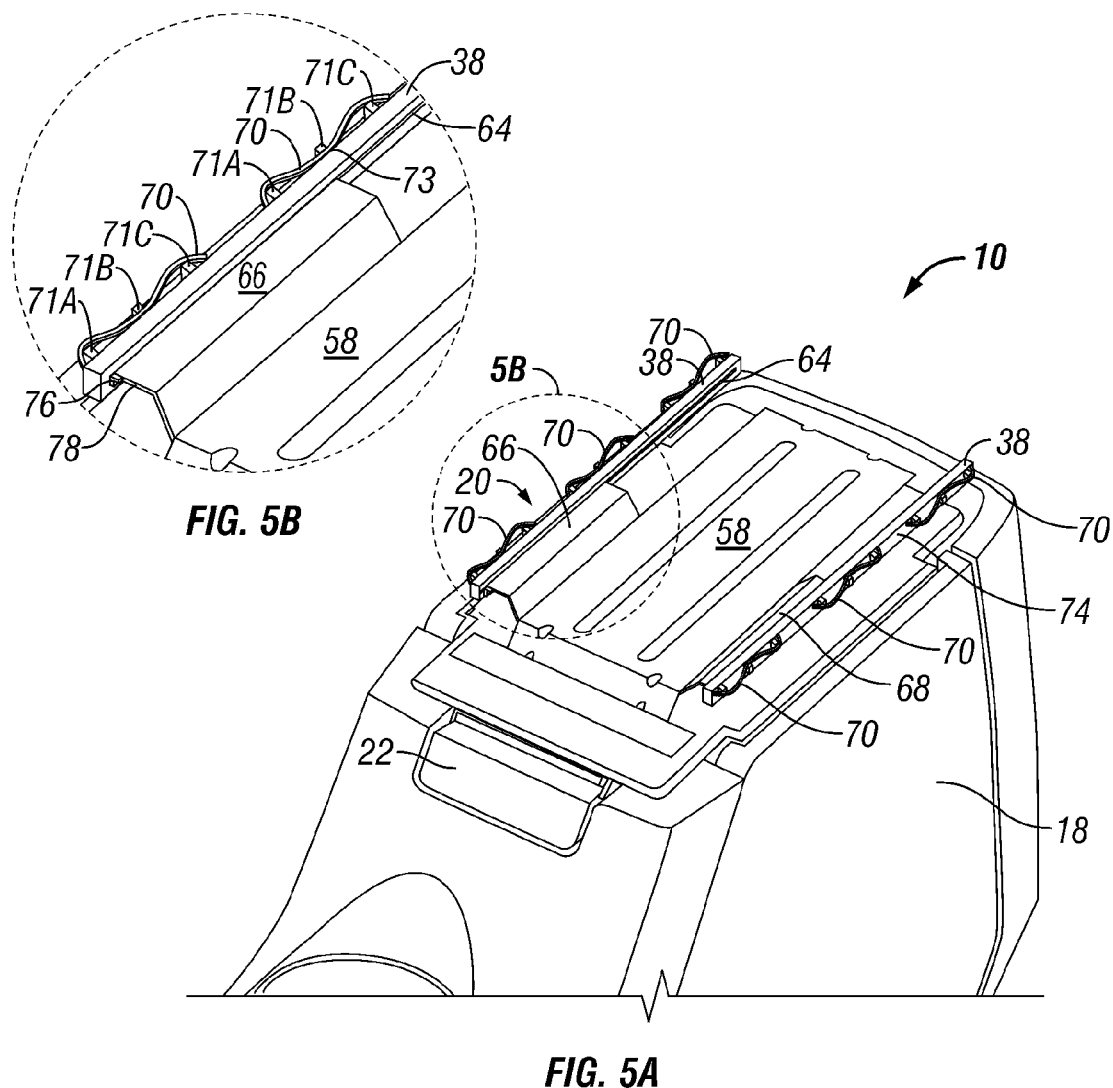
FIG. 5B
FIG. 5A
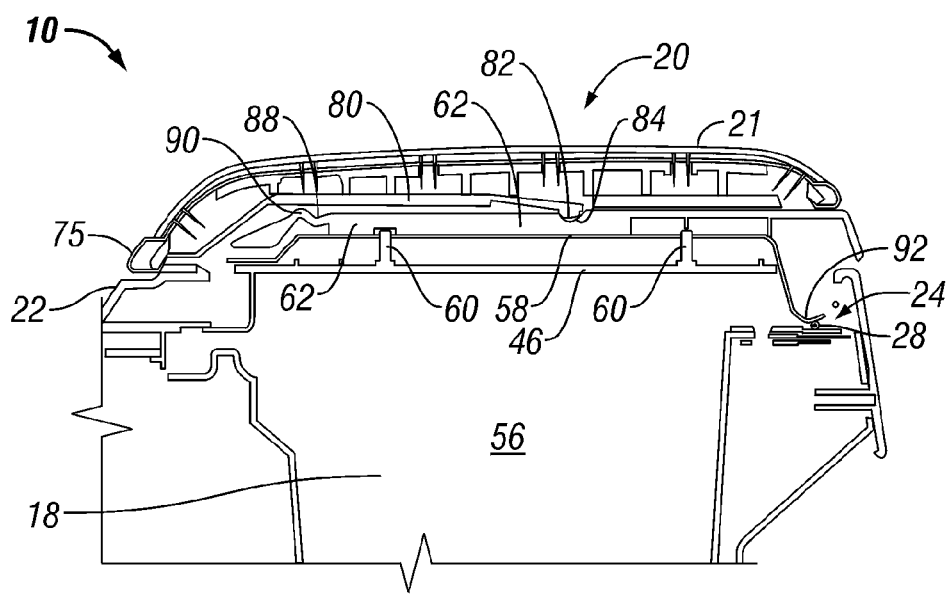
FIG. 6A

CENTER FLOOR CONSOLE SLIDING ARMREST

RELATED APPLICATIONS

This application claims benefit of priority of Provisional Application Ser. No. 60/690,467, filed Jun. 14, 2005, hereby incorporated by reference in its entirety.

BACKGROUND OF INVENTION a. Field of Invention

The invention relates generally to consoles for motor vehicles and the like, and more particularly to a motor vehicle center floor console including a securely guided sliding armrest having improved mechanics for facilitating the sliding operation and for minimizing cross-car deflection of the armrest.

b. Description of Related Art

Motor vehicle consoles are well known in the art and generally include a storage compartment for the storage of objects and a console lid for covering a storage compartment opening as well as for serving as an armrest. Often, the armrest is located at a fixed intermediate position most suited for persons of average size. In some luxury automobiles however, the armrest may be designed to slide in the vehicle's length-wise direction for providing adjustability for different users and their unique driving positions.

Known console sliding armrests generally include a sliding assembly which requires a user to push along the longitudinal direction of the armrest (i.e. the vehicle's length-wise) to release the armrest from a rest position and to continue the sliding movement to one of a predetermined number of locking positions particularly suited for the user. In some armrest sliding assemblies, the sliding movement may be controlled or otherwise facilitated by spring biasing means, known examples of which have thus far been relatively complicated in design and operation, and have also been unreliable during extended use.

One such known console sliding armrest is disclosed in U.S. Pat. No. 6,007,155 to Hara et al. ('155 Patent). Referring to FIG. 1 of the '155 Patent, there is disclosed a guide assembly 100 for a retractable armrest. Guide assembly 100 includes a slide assembly 130 and a biasing assembly 135 which includes first rail member 140 and first biasing member 150. A second mirror-image biasing assembly 137 is provided on the opposite side of slide assembly 130. In operation, a spring 154 urges biasing member 150 against rail member 140 to thus urge member 140 orthogonally towards slide assembly 130, thereby maintaining constant contact between member 140 and slide assembly 130. According to the '155 Patent, this feature eliminates the rattle between member 140 and slide assembly 130, (see discussion in Col. 3:1-10).

As readily evident from the illustration of FIG. 1 of the '155 Patent, the operation of the biasing assembly depends on smooth relative sliding of members 140, 150, and members 160, 170 of the opposite biasing assembly. Over time however, due to the eventual contamination of assemblies 135, 137 from environmental and other factors, members 140, 150 and 160, 170 tend to stick and/or slip, thus deviating from the intended operation of the biasing assemblies. Further, due to the multiple components required for proper operation of each biasing assembly 135, 137, use of such multiple biasing assemblies can be prohibitive both from a cost and reliability standpoint.

Accordingly, there exists a need for a console sliding armrest biasing assembly which includes fewer components for facilitating the manufacturing process. There also exists a need for an armrest biasing assembly in which the components are less susceptible to environmental elements, and are therefore highly reliable for long-term use.

Other exemplary console sliding armrests are disclosed for example in U.S. Pat. No. 6,719,367 to Mic et al. and U.S. Pat. No. 6,244,648 to Gackstatter. Each of these armrest assemblies, which include unique sliding or biasing mechanisms, are nevertheless particularly susceptible to environmental elements which hinder their long-term reliability, and are further susceptible to misalignment and/or malfunction due to the multiple components which must function together during the sliding operation.

It would therefore be of benefit to provide a console sliding armrest which is stable in operation during both extension and retraction of the armrest, and which includes a guiding system having a minimal number of components for securely guiding the armrest from both the longitudinal and lateral directions (i.e. the vehicle's length-wise and width-wise directions) of the armrest. It would also be of benefit to provide a console sliding armrest which is easier and more economical to manufacture, and which provides improved reliability for long-term use as compared to existing sliding armrest designs.

SUMMARY OF INVENTION

The present invention thus solves the problems and overcomes the drawbacks and deficiencies of prior art console sliding armrest designs by providing an improved console sliding armrest assembly including a guide assembly which enables efficient rattle-free sliding operation.

It is therefore an exemplary object of the present invention to provide a console sliding armrest assembly which is less susceptible to environmental elements and is therefore reliable in its long-term operation.

It is also an object of the present invention to provide a console sliding armrest assembly which provides adequate vertical support for the armrest in both the extended and retracted positions.

The invention thus achieves the aforementioned exemplary objects by providing a console sliding armrest assembly for a vehicle. The assembly may include a storage compartment having an opening for allowing ingress and egress of objects. A console lid may be pivotally connected to the storage compartment for substantially covering the storage compartment opening in a closed position and for otherwise allowing ingress and egress of objects in an open position. The console lid may include a sliding armrest operatively engaged therewith and movable between extended and retracted positions. A guide assembly may be disposed substantially within the console lid for securely guiding the sliding armrest between the extended and retracted positions. The guide assembly may include a slider frame connected to the sliding armrest, and a guide plate connected to the console lid for providing vertical support and lateral stability to the sliding armrest. The guide assembly may further include a rail secured to the slider frame, with the rail being slidably engaged with the guide plate for thereby allowing sliding movement of the armrest between the extended and retracted positions. A spring may be disposed between the slider frame and the rail. The spring may be engaged to either the slider frame or the rail for biasing the rail against the guide plate. The spring may thereby regulate tension between the slider frame, the rail and the guide plate during movement of the sliding armrest.

For the console sliding armrest assembly described above, the rail may include a substantially "C" shaped channel for receiving an end of the guide plate. In a particular embodiment of the present invention, the slider frame may include a substantially "C" shaped channel for receiving the rail. The slider frame channel may thus define a substantially sealed cavity for protecting the rail and the spring from environmental elements. The rail may be made of Acetyl or other similar materials. A resilient arm may be connected adjacent a forward end of the console lid. The arm may include a detent engageable with one or more catches on a secondary plate mounted adjacent to or otherwise formed with the guide plate for limiting sliding movement of the armrest in the extended and retracted positions. The guide plate may also form a hinge arm for pivotally connecting the console lid to the storage compartment.

The invention also provides a vehicle sliding armrest assembly including a storage compartment having an opening for allowing ingress and egress of objects, and a compartment lid pivotally connected to the storage compartment and disposable between opened and closed positions. The compartment lid may include an armrest operatively engaged therewith and slidably movable between extended and retracted positions. A guide assembly may be disposed substantially within the compartment lid for securely guiding the armrest between the extended and retracted positions. The guide assembly may include a slider frame connected to the armrest, and a guide plate connected to the compartment lid for providing vertical support and lateral stability to the armrest. The guide assembly may further include a rail secured to the slider frame. The rail may be slidably engaged with the guide plate for thereby allowing sliding movement of the armrest between the extended and retracted positions. The guide assembly may also include biasing means disposed between the slider frame and the rail. The biasing means may be engaged to either the slider frame or the rail for biasing the rail against the guide plate. The biasing means may thereby regulate tension between the slider frame, the rail and the guide plate during sliding movement of the armrest.

For the sliding armrest assembly described above, the rail may include a substantially "C" shaped channel for receiving an end of the guide plate. The slider frame may include a substantially "C" shaped channel for receiving the rail, with the channel defining a substantially sealed cavity for protecting the rail and the biasing means from environmental elements. The biasing means may be a coil spring and/or a leaf spring, or other equivalent spring means. The assembly may further include a resilient arm connected adjacent a forward end of the compartment lid. The arm may include a detent engageable with one or more catches on a secondary plate mounted to or otherwise formed with the guide plate for limiting sliding movement of the armrest in the extended and retracted positions. The guide plate may also form a hinge arm for pivotally connecting the compartment lid to the storage compartment.

The invention yet further provides a method of securely guiding a console sliding armrest for a vehicle. The method may include the step of pivotally connecting a console lid to a console storage compartment. The console lid may be disposable between opened and closed positions for allowing ingress and egress of objects from the storage compartment. The method may also include the steps of operatively engaging an armrest to the console lid, with the armrest being slidably movable between extended and retracted positions relative to the storage compartment, connecting a slider frame to the armrest, and connecting a guide plate to the console lid for vertical support and lateral stability of the armrest. The method may further include the steps of securing a rail to the slider frame, with the rail being slidably engaged with the guide plate for thereby allowing sliding movement of the armrest between the extended and retracted positions, and connecting a spring to either the slider frame or the rail for biasing the rail against the guide plate. The spring may thereby regulate tension between the slider frame, the rail and the guide plate during sliding movement of the armrest.

For the method described above, the spring may be a coil spring and/or a leaf spring, or other equivalent spring structures. The method may also include the step of connecting a resilient arm adjacent a forward end of the console lid, with the arm including a detent engageable with one or more catches on a secondary plate mounted to or otherwise formed with the guide plate for limiting sliding movement of the armrest in the extended and retracted positions. The method may further include the steps of engaging an end of the guide plate with a substantially "C" shaped channel in the rail, and disposing the rail in a substantially "C" shaped channel in the slider frame. The slider frame channel may define a substantially sealed cavity for protecting the rail and the spring from environmental elements. The spring may thus enable regulation of the sliding force required for guiding the armrest between the extended and retracted positions. The force may be regulated to between approximately 6-13 N for sliding movement and less than approximately 23 N for initial movement of the armrest.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 5A is an enlarged isometric view of the console sliding armrest assembly of FIG. 1, with the sliding armrest and various features removed for illustrating components of the guide assembly within the console lid;

FIG. 5B is an enlarged isometric view of a guide rail and springs for the guide assembly of FIG. 5A;

FIG. 6A is a side cross-sectional view of the console sliding armrest assembly of FIG. 1, taken generally along line 2-2 in FIG. 1, illustrating various internal features of the guide assembly of FIG. 4, and the console lid in a retracted position;

DETAILED DESCRIPTION OF THE PREFERRED EMBODIMENTS

Figure 1:
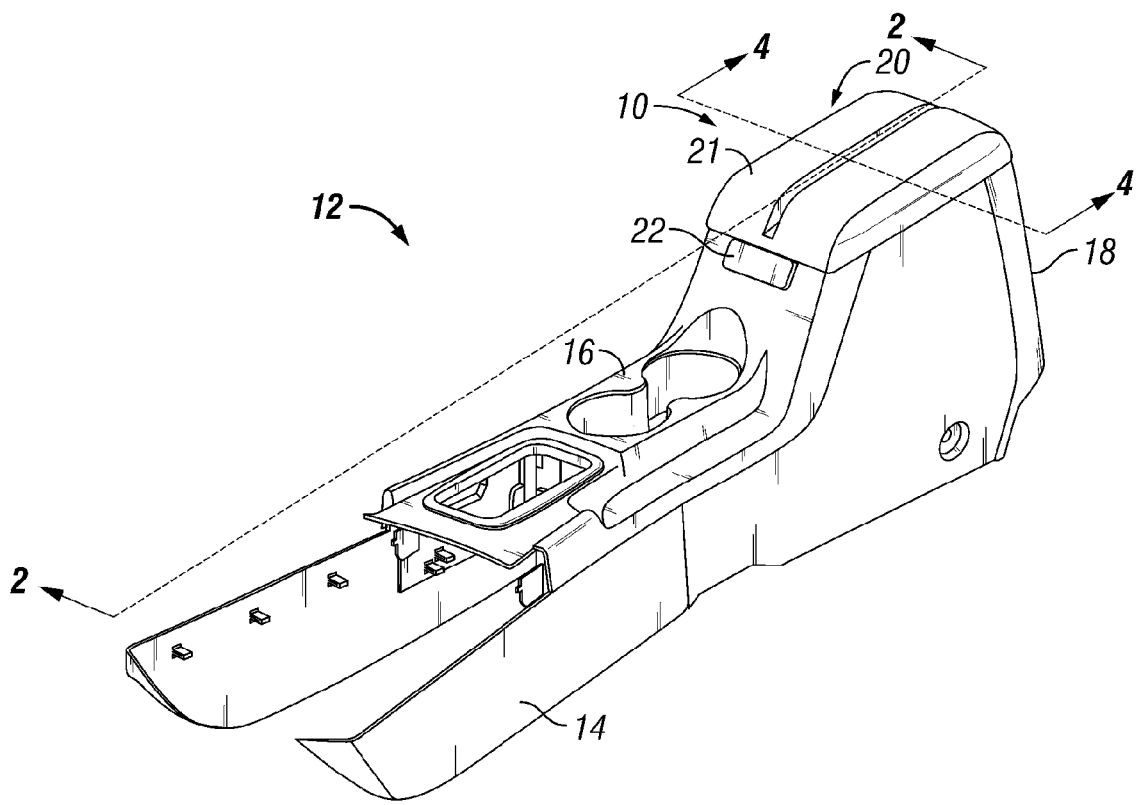
FIG. 1 is an isometric view of a vehicle console sliding armrest assembly according to the present invention.

Turning now to the drawings wherein like reference characters refer to like and corresponding parts throughout the several views, FIGS. 1-7 illustrate a console sliding armrest assembly according to the present invention, generally designated sliding armrest assembly 10.

Figure 2:
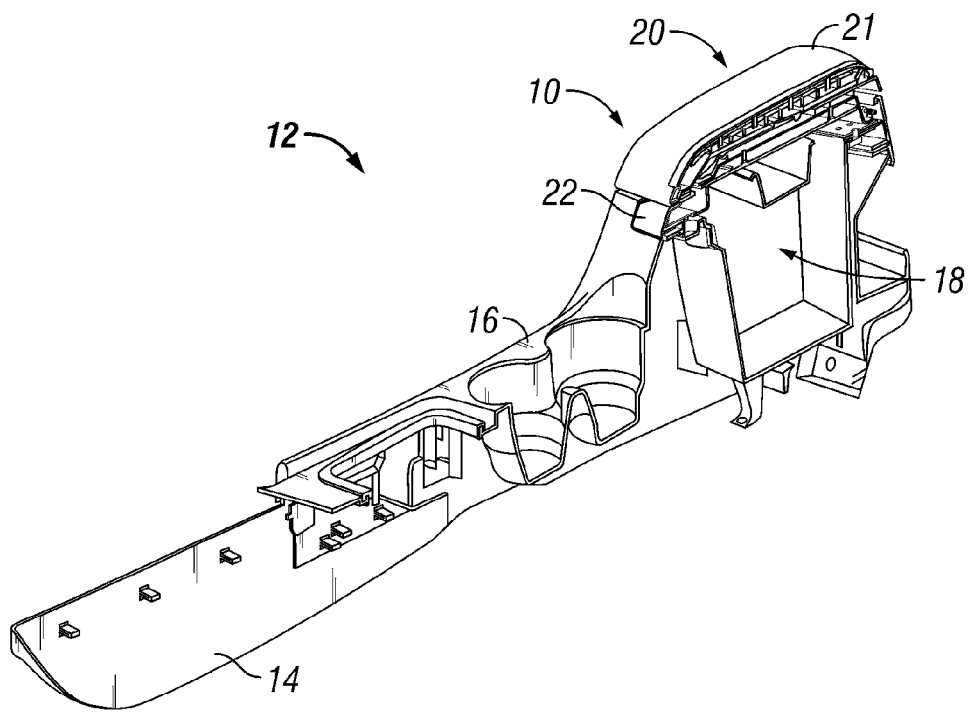
FIG. 2 is a cross-sectional view of the console sliding armrest assembly of FIG. 1, taken substantially along line 2-2 in FIG. 1, illustrating various internal features of the assembly.

As shown in FIGS. 1 and 2, sliding armrest assembly 10 may be mounted on a console 12 disposed centrally in a motor vehicle between a driver's and passenger's front seats. As readily evident to those skilled in the art, console 12 and/or sliding armrest assembly 10 may be disposed at any desirable location in a motor vehicle, without departing from the scope of the present invention. Console 12 may include a base 14 affixable to a vehicle frame (not shown), and other sub-components including cup-holders 16 and the like attached thereto. Other standard features such as a storage compartment 18 and console lid 20 may be provided, with lid 20 being pivotally mounted to compartment 18 and releasable by means of a release lever 22, as discussed in further detail below.

Figure 3:
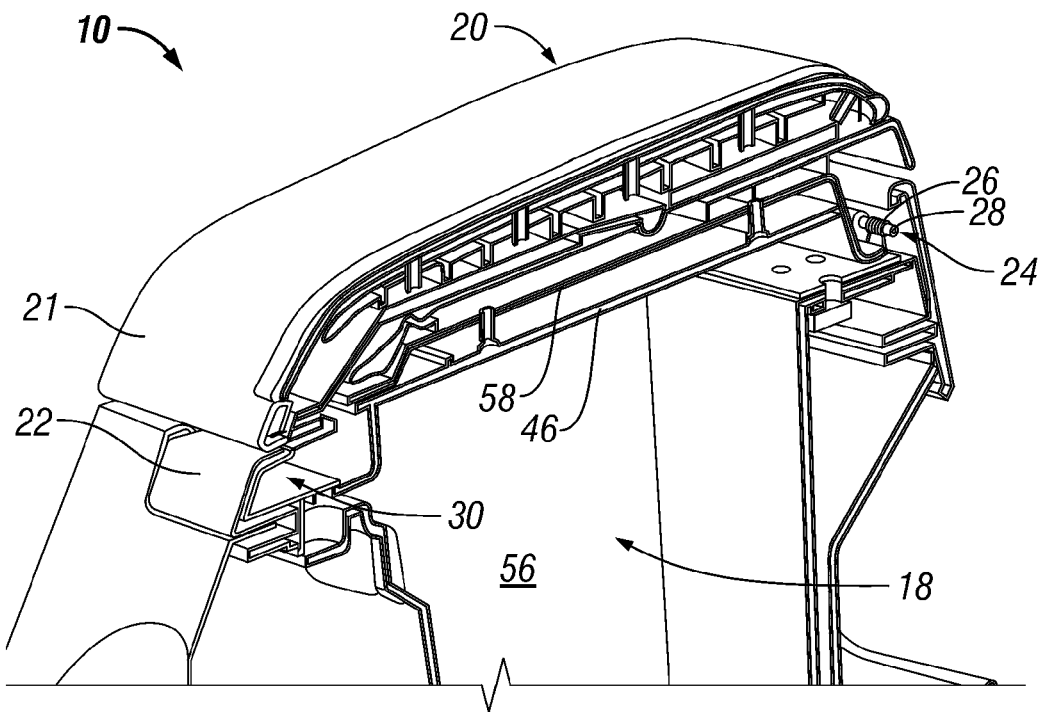
FIG. 3 is an enlarged cross-sectional view of the console sliding armrest assembly of FIG. 1, taken substantially along line 2-2 in FIG. 1, illustrating a mechanism for limiting forward and aft sliding movement of a sliding armrest.

Referring to FIGS. 2 and 3, which illustrate cross-sectional views of sliding armrest assembly 10, console lid 20 may be pivotally mounted at 24 by means of a spring biased pivot connection. In the embodiment of FIGS. 2 and 3, the pivot connection may include a standard torsional spring 26 mounted on a pivot rod 28 for biasing lid 20 to an open position. Further, as briefly discussed above, a release lever 22 may be mounted at 30 for enabling console lid 20 to be opened and closed as is known in the art.

Turning next to FIGS. 4-7 (particularly FIG. 7), sliding armrest assembly 10 may include a guide assembly 32 for permitting sliding of an armrest 21 operatively engaged with console lid 20, for sliding in the vehicle forward and aft directions. Guide assembly 32 may include a unitary slider frame 34 having mirror-image "C" shaped channels 36 which frictionally retain guide rails 38 therein. Channels 36 may be formed on frame ends 40 which include oblique angle supports 42 and vertical supports 44 for providing vertical support in the event of downwards pressure placed on console lid 20 by a user. Vertical supports 44 may further bear against horizontal support plate 46, the edges 48, 50 of which are disposed within areas 52, 54 of compartment walls 56, 57. In this manner, console lid 20 may be supported by the structure of compartment 18. Further, the material adjacent areas 52, 54 may be resilient for engaging edges 48, 50 and thus sealingly enclosing the contents of the compartment.

Figure 4:
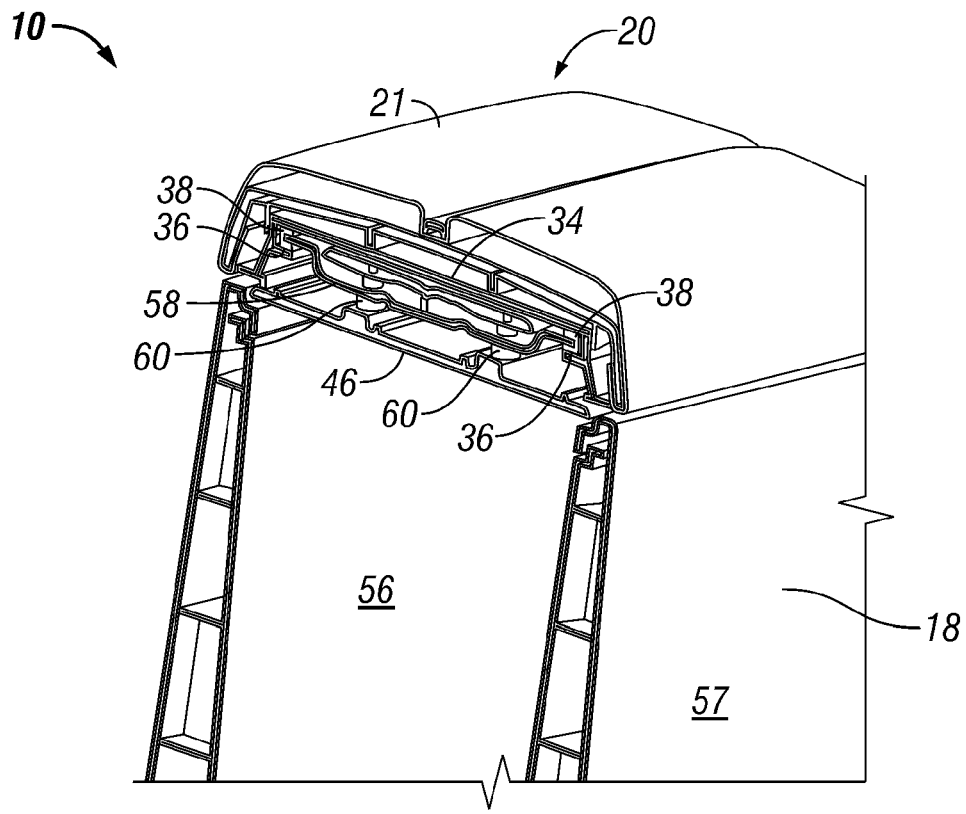
FIG. 4 is another enlarged cross-sectional view of the console sliding armrest assembly of FIG. 1, taken substantially along line 4-4 in FIG. 1, illustrating various internal features of a guide assembly for guiding movement of the sliding armrest.
Figure 7:
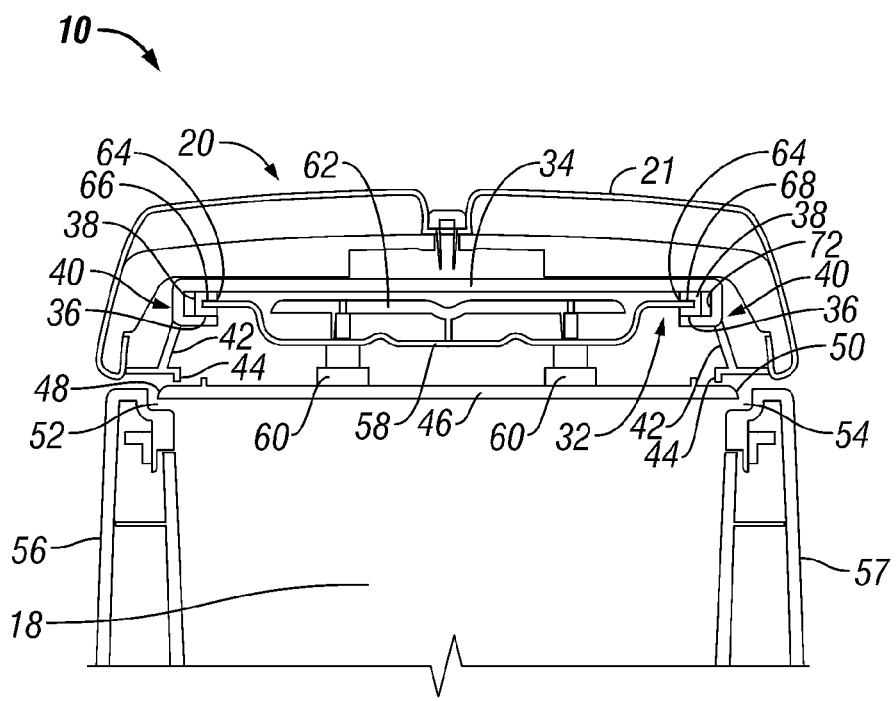
FIG. 7 is a front cross-sectional view of the console sliding armrest assembly of FIG. 1, taken generally along line 4-4 in FIG. 1, illustrating various internal features of the guide assembly of FIG. 4.

Referring to FIGS. 4, 5A and 7, guide assembly 32 may further include a guide plate 58 fixedly mounted to support plate 46 by means of support columns 60, which in the particular embodiment of FIG. 7 are screw bosses. Plate 58 may include a secondary plate 62 attached thereto or formed therewith for providing additional rigidity to the overall structure of the guide assembly, especially from lateral forces applied to console lid 20 (and armrest 21), and for further limiting forward and aft movement of the armrest as discussed in greater detail below.

As shown in FIGS. 5A and 7, guide rails 38, which are engaged and retained in channels 36 of frame 34, may include complementary slots 64 for sliding engagement with ends 66, 68 of guide plate 58. In this manner, guide rails 38 and frame 34 move as a unit relative to stationary guide plate 58 and support plate 46 for permitting sliding movement of armrest 21 relative to storage compartment 18. In the embodiment shown, rails 38 may be formed of Acetyl or the like for permitting smooth and efficient sliding of ends 66, 68 of guide plate 58 relative to the rails.

Referring to FIGS. 5A, 5B and 7, in order to maintain the alignment of rails 38 relative to frame 34 and guide plate 58, and to further require a user to exert a predetermined force for movement of armrest 21, leaf springs 70 may be mounted to outer wall 74 of each rail 38 and disposed in engagement with inner wall 72 of each channel 36. In the particular embodiment illustrated, three leaf springs may be mounted by press-fitting onto rails 38, one spring adjacent each outer-most end of the rail and a third spring disposed generally centrally along the rail. As shown in FIG. 5B, the springs may be snap-fitted by means of posts 71A-71C, with the central post 71B including a gap 73 for permitting press-fitting of the spring, and posts 71A and 71C being provided for maintaining proper alignment of the spring. Springs 70 may be formed of a mirror-image curved profile as shown such that the opposing leafs of the spring each exert a uniform force on the inner wall 72 of each channel 36. In this manner, rails 38 may be maintained at a predetermined orientation and with a predetermined frictional engagement force relative to ends 66, 68 of guide plate 58. As mentioned above, the use of springs 70 also prevents inadvertent misalignment of rails 38 within channels 36. While in the exemplary embodiment shown, rails 38 are maintained in the predetermined alignment by leaf springs 70, those skilled in the art would appreciate in view of this disclosure that other biasing means, such as a coil spring or other resilient material may be used instead of or in addition to leaf springs 70 without departing from the scope of the present invention. Further, instead of being connected to rails 38, the springs may be likewise connected to inner wall 72 of each channel 36 for biasing the rails as discussed above.

Referring next to FIGS. 5A, 5B, 6A and 6B, in order to positively limit sliding movement of armrest 21 in the vehicle aft direction, each rail 38 may be configured to include a stop 76 adjacent a front end thereof for engagement with edge 78 of guide plate 58. In order to limit movement of armrest 21 in the vehicle forward direction, a resilient arm 80 may be attached to front end-piece 75 of armrest 21 and include a semi-spherical detent 82 disposable within a complementary catch 84 formed in secondary plate 62. In this manner, a user may apply a force "F" in the vehicle forward direction on the surface of armrest 21 to release detent 82 from catch 84 until the detent engages with forward catch 88, which also includes a raised end-portion 90 for preventing further forward movement of armrest 21. Those skilled in the art would appreciate in view of this disclosure that a plurality of catches may be provided on secondary plate 62 for providing predetermined intervals at which armrest 21 may be maintained for different users.

Referring to FIGS. 5A, 6A, 6B and 7, in order to minimize the number of components for sliding armrest assembly 10, guide plate 58 may include a bent portion 92 for integration into the pivot connection for console lid 20. In this manner, the guide plate serves multiple purposes, the first of providing a structure relative to which armrest 21 can slide, the second of providing a structure for supporting lid 20 during pivoting thereof, and the third of providing a structure for supporting armrest 21 in the extended and retracted positions of FIGS. 6B, 6A, respectively.

Figure 6B:
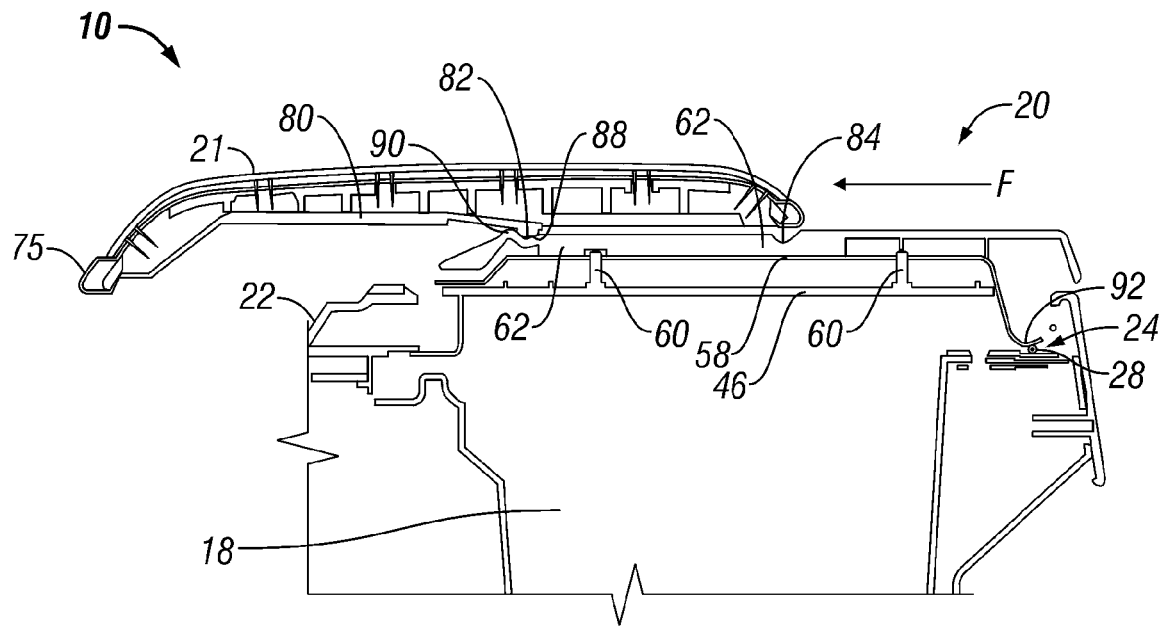
FIG. 6B is another side cross-sectional view of the console sliding armrest assembly of FIG. 1, taken generally along line 2-2 in FIG. 1, illustrating various internal features of the guide assembly of FIG. 4, and the console lid in an extended position.

Referring next to FIGS. 1, 6A and 6B, in a particular embodiment of sliding armrest assembly 10, arm 80 and catch members 84, 88 may be dimensioned and spaced such that armrest 21 slides approximately 98 mm (i.e. approximately 4 inches) from the retracted position of FIG. 6A to the extended position of FIG. 6B. It has been determined that a 98 mm range of forward movement allows armrest 21 to be ergonomically adaptable to approximately 80% of users. Further, referring to FIGS. 1, 6A, 6B and 7, the tension in arm 80 and springs 70 may be preset such that a user is required to exert a forward force of approximately 23 Newtons on armrest 21 to disengage detent 82 from catch 84, and is further required to maintain a forward force of approximately 6-13 Newtons for armrest movement between catch members 84, 88. The noted exemplary force ranges prevent inadvertent release and sliding of armrest 21, while also providing a user with sufficient ergonomic comfort in sliding the armrest as needed. As discussed above, the noted exemplary force ranges are regulated by means of springs 70. Of course, those skilled in the art would readily appreciate in view of this disclosure that the exemplary distance between adjacent catch members 84, 88, the length of arm 80, as well as the tension generated by arm 80 and springs 70 may be adjusted as needed to change the range of movement of armrest 21 and the effort needed by a user to initiate and maintain the movement.

Thus to summarize, the present invention sliding armrest assembly 10 provides a guide assembly which enables efficient rattle-free sliding operation of the armrest. The sliding armrest assembly is also less susceptible to environmental elements, is easier and more economical to manufacture, and is highly reliable for long-term use as compared to existing sliding armrest designs.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A console sliding armrest assembly for a vehicle, said assembly comprising:
   a storage compartment having an opening for allowing ingress and egress of objects;
   a console lid pivotally connected to said storage compartment for substantially covering said storage compartment opening in a closed position and for otherwise allowing ingress and egress of objects in an open position, said console lid including a sliding armrest operatively engaged therewith and movable between extended and retracted positions; and
   a guide assembly disposed substantially within said console lid, said guide assembly securely guiding said sliding armrest between said extended and retracted positions, and including:
   a slider frame connected to said sliding armrest, said slider frame including a channel, wherein the slider frame comprises at least one portion having a substantially "C" shaped cross-section;
   a guide plate connected to said console lid for providing vertical support and lateral stability to said sliding armrest;
   at least one rail secured to said slider frame, said rail being slidably engaged with said guide plate for thereby allowing sliding movement of said armrest between said extended and retracted positions, wherein said rail is disposed substantially within said slider frame; and
   at least one biasing member disposed between said slider frame and said rail, said biasing member being engaged to either said slider frame or said rail for biasing said rail against said guide plate, said spring biasing member thereby regulating tension between said slider frame, said rail and said guide plate during movement of said sliding armrest.

2. An assembly according to claim 1, wherein said rail includes a substantially "C" shaped cross-section for receiving an end of said guide plate.

3. An assembly according to claim 1, wherein said at least one substantially "C" shaped cross-section for receiving said rail, said channel defines a substantially sealed cavity for protecting said rail and said biasing member from environmental elements.

4. An assembly according to claim 1, wherein said rail is made of Acetyl.

5. An assembly according to claim 1, further comprising a resilient arm connected adjacent a forward end of said console lid, said arm including a detent engageable with at least one catch on a secondary plate mounted to or formed with said guide plate for limiting sliding movement of said armrest in said extended and retracted positions.

6. An assembly according to claim 1, wherein said guide plate forms a hinge arm for pivotally connecting said console lid to said storage compartment.

7. An assembly according to claim 1, wherein said biasing member comprises a spring.

* * * * *